United States Patent
Bruso

[11] Patent Number: 5,988,947
[45] Date of Patent: Nov. 23, 1999

[54] MULTI-SECTION SOIL REMEDIATION DEVICE

[76] Inventor: Bruce L. Bruso, RR1 Box 1T, E. Mountain Rd., Hegins, Pa. 17938

[21] Appl. No.: 08/964,459

[22] Filed: Nov. 4, 1997

[51] Int. Cl.$^6$ .............. B09C 1/06; B09C 1/08; B09C 1/10

[52] U.S. Cl. .............. 405/128; 110/241; 435/262.5; 588/220; 588/256; 588/900

[58] Field of Search .................. 405/128, 131; 588/205, 220, 249, 256, 900; 110/236, 240, 241; 435/262.5

[56] References Cited

U.S. PATENT DOCUMENTS

| | | | |
|---|---|---|---|
| 3,603,097 | 9/1971 | Zaklewicz . | |
| 3,607,097 | 9/1971 | Auphan et al. . | |
| 4,028,902 | 6/1977 | Courson et al. . | |
| 4,648,332 | 3/1987 | Goedhart | 110/346 |
| 4,667,609 | 5/1987 | Hardison et al. | 588/900 X |
| 4,681,483 | 7/1987 | Camilleri | 405/267 |
| 4,738,206 | 4/1988 | Noland | 110/346 |
| 4,776,409 | 10/1988 | Manchak, Jr. | 175/50 |
| 4,843,742 | 7/1989 | Camelleri | 37/90 |
| 4,844,839 | 7/1989 | Manchak, Jr. | 252/633 |
| 4,913,586 | 4/1990 | Gabbita | 405/129 |
| 4,919,570 | 4/1990 | Payne | 405/128 |
| 4,927,293 | 5/1990 | Campbell | 405/128 |
| 5,020,452 | 6/1991 | Rybak | 110/241 |
| 5,037,479 | 8/1991 | Stanforth | 106/691 |
| 5,052,858 | 10/1991 | Crosby et al. | 405/128 |
| 5,072,674 | 12/1991 | Noland et al. | 110/346 |
| 5,088,856 | 2/1992 | Yocum | 405/128 |
| 5,103,578 | 4/1992 | Rickard | 34/92 |
| 5,111,756 | 5/1992 | Anderson | 110/240 |
| 5,117,771 | 6/1992 | Summers | 110/346 |
| 5,118,230 | 6/1992 | Justice | 405/128 |
| 5,121,699 | 6/1992 | Frank | 110/246 |
| 5,148,757 | 9/1992 | McCrossan | 110/216 |
| 5,161,326 | 11/1992 | Weirich et al. | 47/1.42 |
| 5,176,445 | 1/1993 | Mize | 366/7 |
| 5,193,935 | 3/1993 | Musil | 405/128 |
| 5,199,354 | 4/1993 | Wood | 110/241 |
| 5,202,033 | 4/1993 | Stanforth et al. | 210/747 |
| 5,230,167 | 7/1993 | Lahoda et al. | 34/75 |
| 5,236,282 | 8/1993 | Teasel et al. | 405/128 |
| 5,242,245 | 9/1993 | Schellstede | 405/128 |
| 5,242,246 | 9/1993 | Manchak, III et al. | 405/128 |
| 5,244,308 | 9/1993 | Mims | 405/128 |
| 5,259,962 | 11/1993 | Later | 405/128 |
| 5,350,252 | 9/1994 | Musil et al. | 405/128 |
| 5,368,411 | 11/1994 | Losack | 405/128 |
| 5,459,065 | 10/1995 | Aust et al. | 435/562.5 |
| 5,544,975 | 8/1996 | Vigneron et al. | 405/128 |
| 5,569,155 | 10/1996 | Pal et al. | 405/128 X |
| 5,597,730 | 1/1997 | Aust et al. | 435/262.5 |
| 5,637,154 | 6/1997 | Shorthouse | 588/900 X |

FOREIGN PATENT DOCUMENTS

| | | |
|---|---|---|
| 32 09 134 | 9/1983 | Germany . |
| 232 325 | 1/1986 | Germany . |

OTHER PUBLICATIONS

Kenterprise Research, Inc. paper entitled "Membrane–Like–Material and Direct–Nucleate–Flotation AFFF Waste Residue Processing". undated.

Plasma Technology, Inc. paper entitled "Induction Coupled Plasma (ICP) in Comparison with Arc Plasma Systems An Introduction." Jan. 1997.

FMC, brochure entitled "PermeOX® Solid Peroxygen Can Enhance Conventional Bioremediation Methods". undated.

Research Paper, Kenterprise Research, Inc., entitled "MLM Process For Soluble Plus Insoluble Oil Recovery", *The KpX Process,* undated.

Booklet RMT, RMT Metals Remediation Technologies, undated.

Paper, Thermatrix, Inc. . . . Technology beyond Compliance, undated.

*Primary Examiner*—George Suchfield
*Attorney, Agent, or Firm*—Seidel Gonda Lavorgna & Monaco, PC

[57] ABSTRACT

The present invention relates generally to a soil remediation device, and more particularly to a multi-section soil remediation device having at least one section for applying a variety of soil treatment regimes. The multi-section device can be independent of, or be adapted to mount to, a vehicle for operation in the field.

50 Claims, 6 Drawing Sheets

MULTI-SECTION SOIL REMEDIATION DEVICE

FIELD OF THE INVENTION

The present invention relates generally to a soil remediation device, and more particularly to a multi-section soil remediation device having at least one section for applying a variety of soil treatment regimes The multi-section device can be adapted to mount to a vehicle for operation in the field.

BACKGROUND OF THE INVENTION

It is widely recognized that years of industry has produced numerous environmentally hazardous sites throughout the country and the world which pose substantial health hazards to the world's population. In recent years, efforts to clean up or remediate environmentally contaminated sites have increased dramatically. Numerous methods and devices for cleaning up or disposing of environmental contamination in water, air and soil have been devised. The magnitude of the environmental contamination is enormous in comparison to the resources made available to solve this problem.

To address the problem of environmental contamination and particularly soil contamination, a variety of soil treatment and decontamination techniques have been developed. These techniques involve, but are not limited to the application of fluids, biological agents, heat, vacuum, pressurized gases, and mechanical agitation. In order to remediate contaminated soil, it is often necessary to apply several different treatment techniques either alone or in some combination and order that is usually determined by the particular contaminate or contaminates under remediation.

As a consequence, there is an urgent need for a device that can be easily adapted in the field to apply a variety of treatment techniques. This device should be relatively uncomplicated, rapidly configured and assembled in the field, and cost effective. The present invention addresses and solves many of the above-mentioned problems associated with currently available systems.

SUMMARY OF THE INVENTION

The present invention relates to a multi-section soil remediation device having at least one section for applying a variety of soil treatment regimes. The multi-section device can be adapted to mount to a vehicle for operation in the field.

The multi-section device includes at least two soil remediation chambers each having an inlet, an outlet, and a soil conveyor for conveying soil from the chamber inlet to its outlet. The soil remediation chamber is arranged such that the outlet of at least one remediation chamber feeds soil into the inlet of at least one other remediation chamber. The multi-section device also includes a soil treatment delivery system connected to and in communication with at least one of said soil remediation chambers. The soil treatment delivery system delivers soil treatment to the soil that is conveyed within the soil remediation chamber.

It is an object of this invention to provide a multi-section soil remediation device that is relatively uncomplicated, rapidly configured and assembled in the field for applying various treatment techniques in cost effective manner to remediate environmentally contaminated sites. It is another object of this invention to provide a highly mobile apparatus for remediating environmental contaminants. It is yet another object of this invention to provide a method of remediating contaminated soil in situ and without removal or disposal of the treated or contaminated material to a remote location. It is yet another object of the invention to provide a method that is capable of remediating contaminated soils and sludge in a continuous manner.

BRIEF DESCRIPTION OF THE INVENTION

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

The present invention is a multi-section soil remediation device having at least one section for applying a variety of soil treatment regimes. The multi-section device can be adapted to mount to a vehicle for operation in the field.

Figure 1:
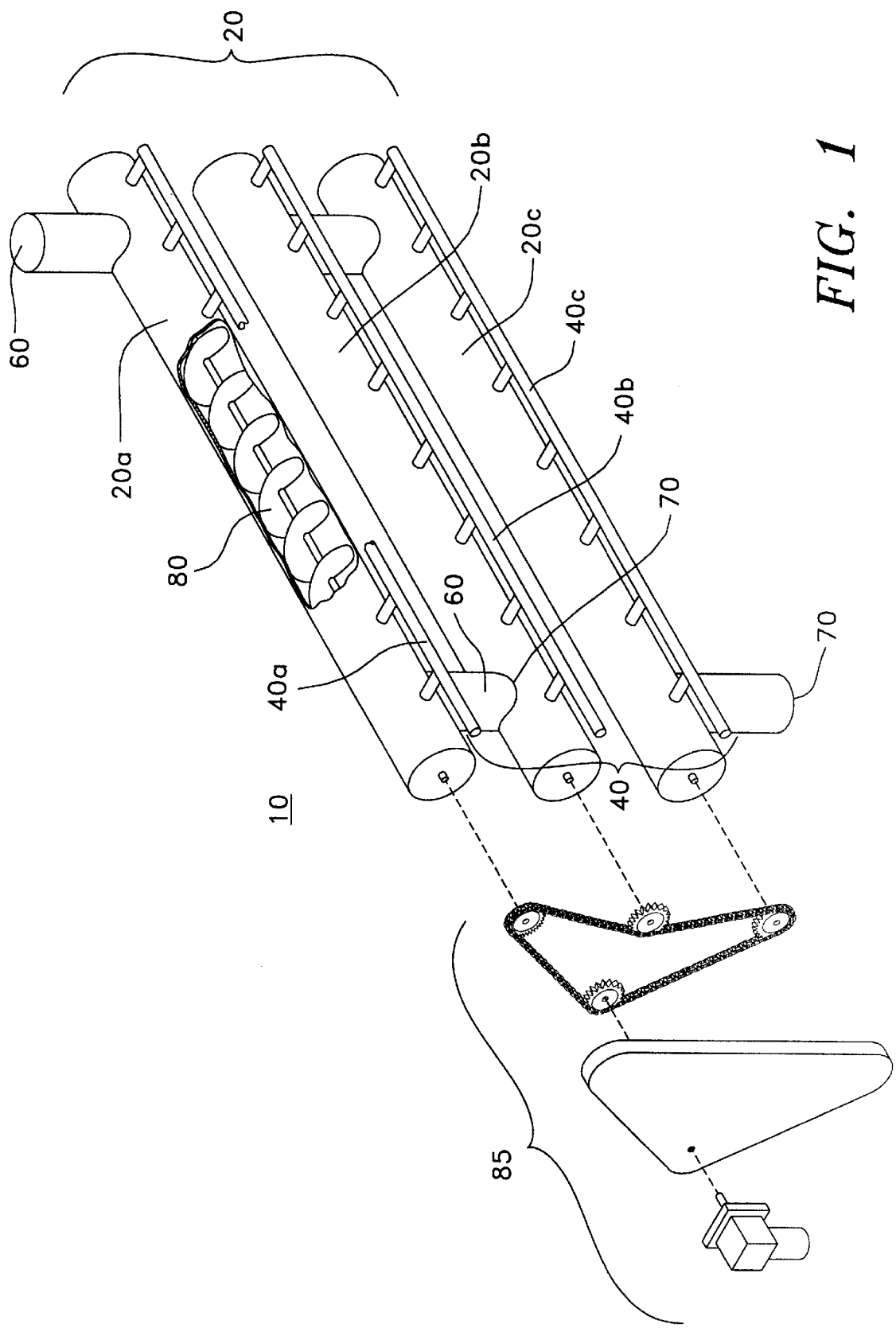
FIG. 1 is an illustration of a multi-section soil remediation device as contemplated by the present invention.

Referring now to the drawings, wherein like numerals indicate like elements, there is shown in FIG. 1 a multi-section soil remediation device 10 as contemplated by the present invention. The multi-section soil remediation device 10 includes a plurality of soil remediation chambers 20. Each chamber 20a,20b,20c having an inlet 60, an outlet 70, and a soil conveyor 80 therein for conveying soil from the chamber inlet 60 to its outlet 70. The soil remediation chambers 20 being arranged such that the outlet 70 of at least one remediation chamber feeds soil into the inlet 60 of at least one other remediation chambers 20.

The inlet 60 of one soil remediation chambers 20 is designed to fit within the outlet 70 of another soil remediation chambers 20. For example, the shape of the inlet 60 and outlet 70 are matingly frustoconical such that one fits within the other forming a tight seal. The seal can be further enhanced by form gaskets or elastic collars. The soil remediation chambers 20 are typically arranged in a vertical orientation and supported by a frame that maintains the position of the soil remediation chambers 20 and the seal between the inlet 60 and outlet 70. However, it is understood that the arrangement of the soil remediation chambers 20 can be in any orientation including vertical, horizontal, or some combination thereof. In addition the form, mating, and seal between the inlet 60 and outlet 70 of two soil remediation chambers 20 can also be varied in shape and material.

The multi-section soil remediation device 10 also includes a soil treatment delivery system 40) having a plurality of treatment delivery elements 40a, 40b, 40c connected to and in communication with at least one of said soil remediation chambers 20 for delivering soil treatment to soil conveyed within the soil remediation chambers 20. The soil conveyor 80 is powered by a commercially available drive system 85 such as, but not limited to, a gear and chain arrangement powered by a gas or diesel engine or hydraulic motor (not shown).

In one aspect of the present invention as shown in FIG. 1, the soil remediation chambers 20 are preferably cylindrical tubes. However it is understood that the soil remediation chambers 20 are not limited to cylindrical tubes and can be any shape such as, but not limited to, oval or rectangular. The chambers 20 have a screw-type conveyor 80 that is operative within the cylindrical tubes 20a, 20b, 21c and move the soil received through the inlet 60 until discharged through the outlet 70 by the cylinders 20a, 20b, 20c.

Figure 2:
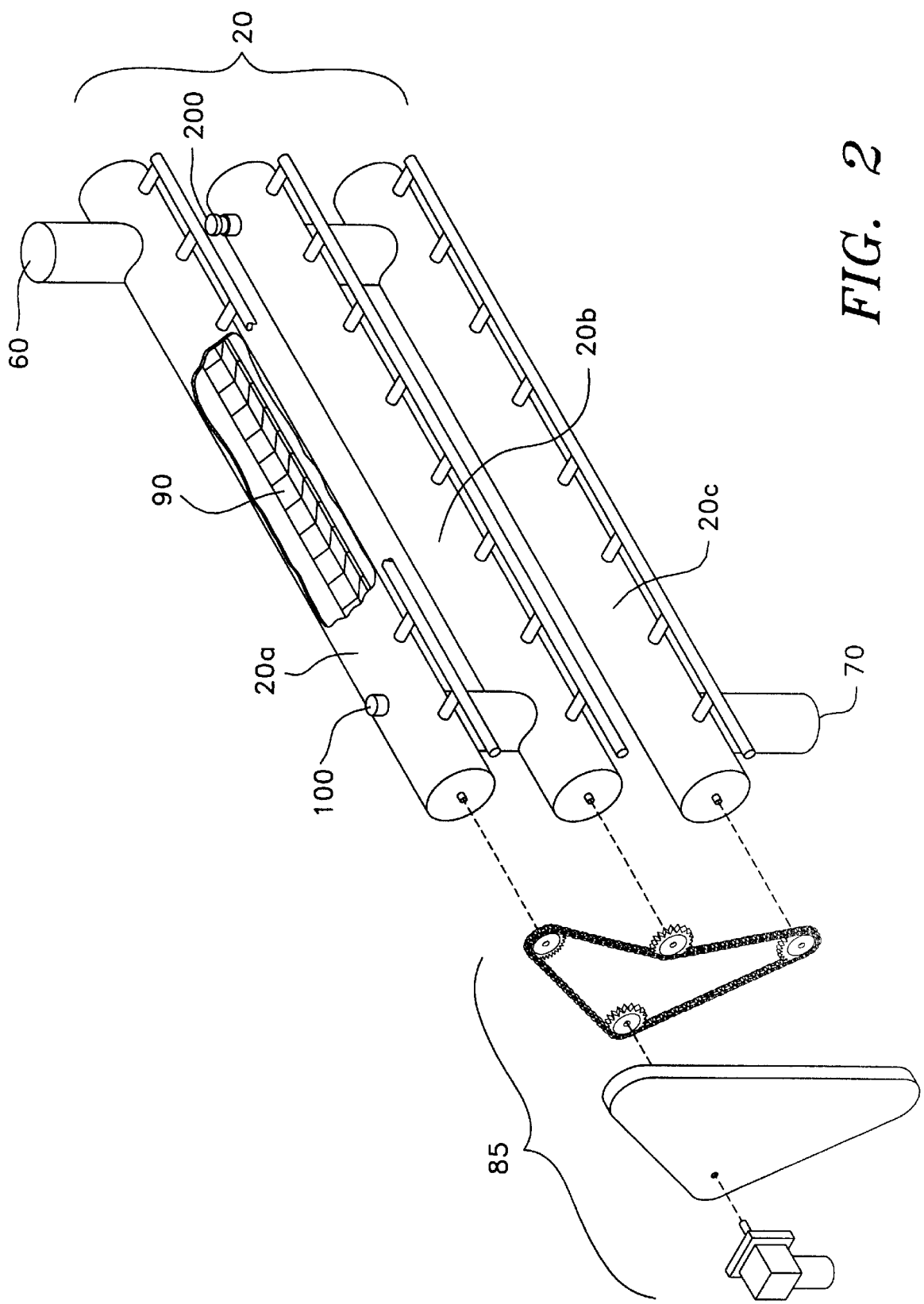
FIG. 2 is an illustration of a multi-section soil remediation device as contemplated by the present invention having an alternate soil conveying mechanism.

In another aspect of the present invention as shown in FIG. 2, the chambers 20 have a belt-type conveyor 90 that is operative within the cylindrical tubes 20a, 20b, 20c. The belt-type conveyor 90 moves the soil received by the inlet 60 so that it can be discharged through the outlet 70. The soil is treated as it is conveyed through the cylindrical tubes 20a, 20b, 20c by materials injected in and removed from the tubes by the treatment delivery system 40.

Figure 3A:
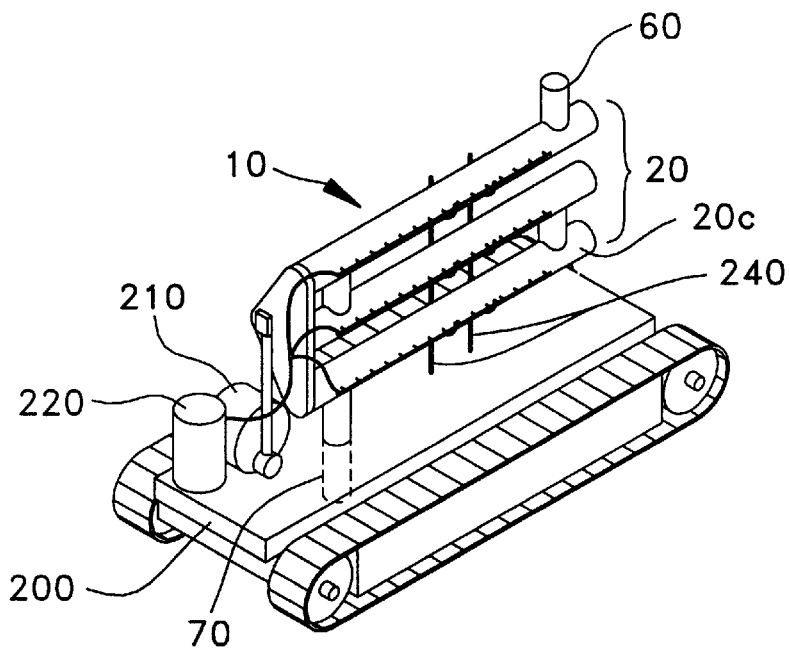
FIG. 3A is an illustration of a multi-section soil remediation device as contemplated by the present invention shown attached to a vehicle.

In another aspect of the present invention as shown on FIG. 3A, the soil remediation chambers 20 of the multi-section soil remediation device 10 are arranged in a vertical plane and supported by a frame 240 attached to a track vehicle 200. In this aspect of the multi-section soil remediation device 10, the conveyors (not shown) are powered by equipment on the track vehicle 200. The soil is fed into the inlet 60 of the soil remediation chambers 20 where it is remediated and discharged through the outlet 70. It is understood that the location of the inlet 60 and outlet 70 can be anywhere on or near the track vehicle 200. For example, FIG. 3A shows the outlet the soil remediation chamber 20c to be within the body of the track vehicle 200. In another example, FIG. 3B shows the outlet the soil remediation chambers 20c to be outside the body of the track vehicle 200.

Figure 3B:
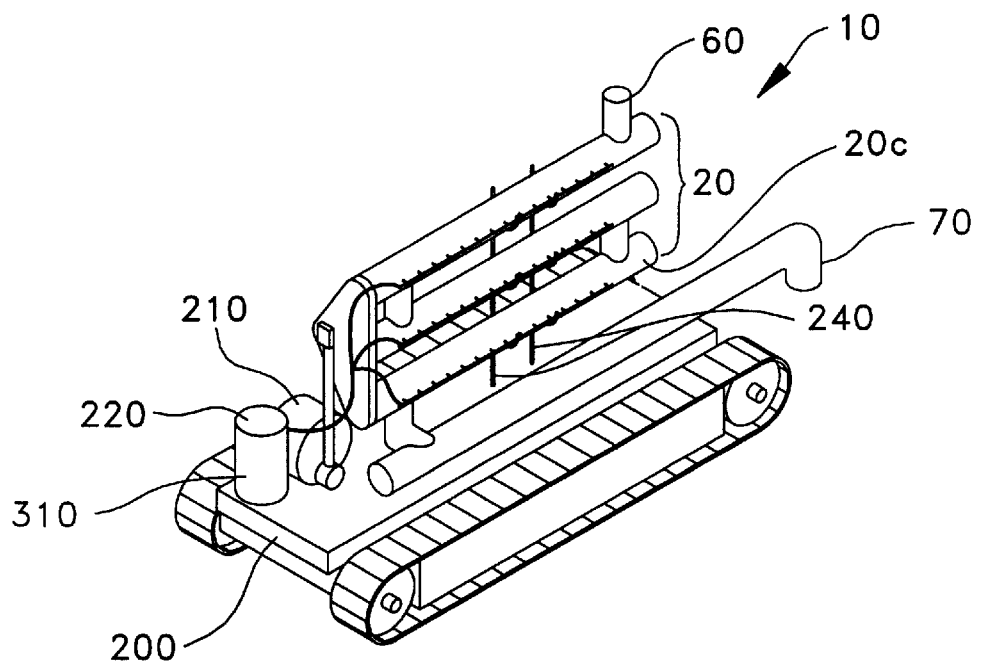
FIG. 3B is an illustration of a multi-section soil remediation device as contemplated by the present invention having an alternate discharge arrangement.
Figure 3C:
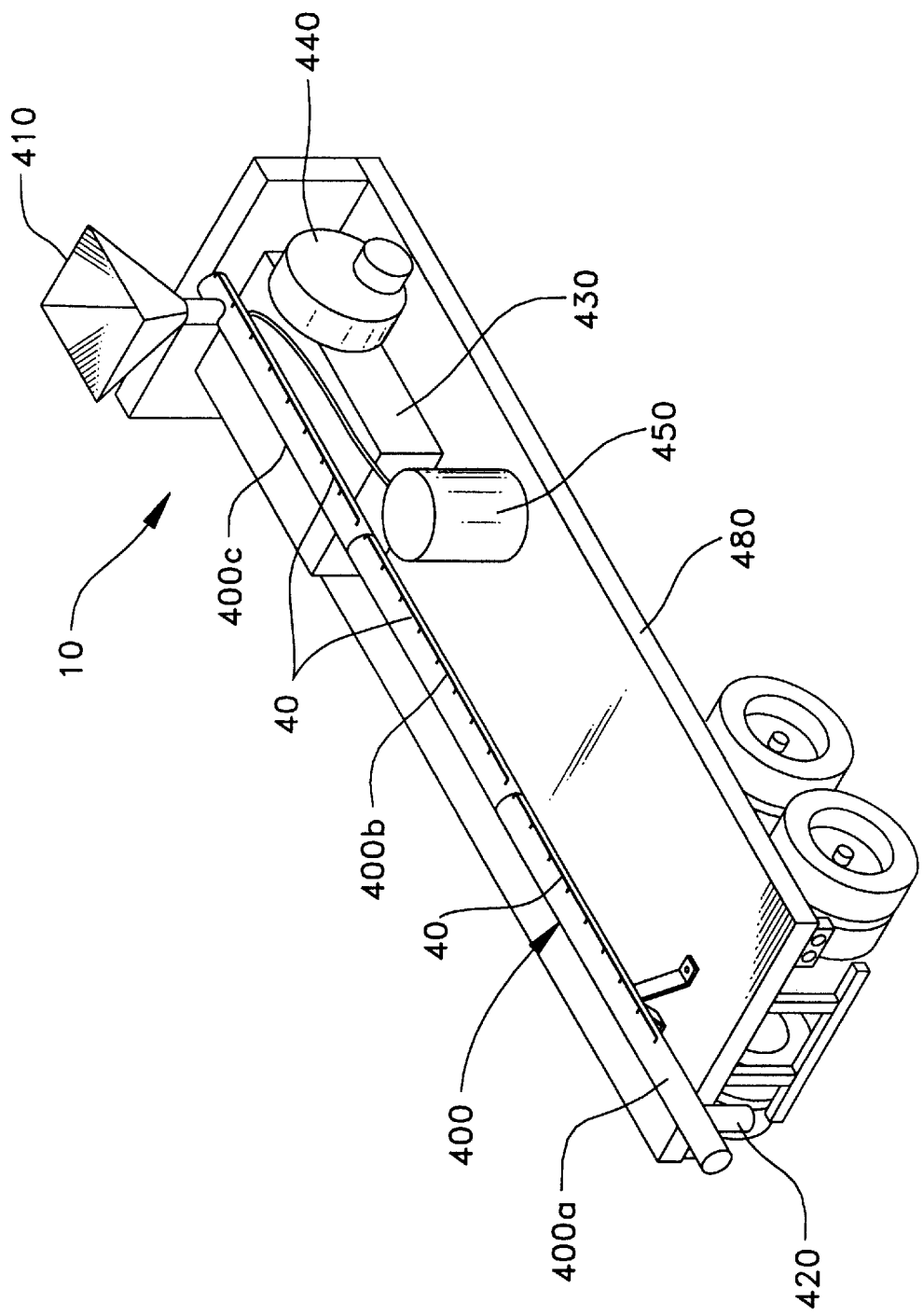
FIG. 3C is an illustration of a multi-section soil remediation device as contemplated by the present invention having a horizontal arrangement of elements and shown attached to a vehicle.

In another aspect of the present invention as shown in FIG. 3C, a multi-section soil remediation device 10 is shown having a horizontal arrangement of soil remediation chambers 400 also shown attached to a vehicle 480. The conveyors (not shown) within the soil remediation chambers 400 are powered by a power unit 430 on the track vehicle 480.

In all aspects of the present invention, the multi-section soil remediation device 10 includes a soil treatment delivery system 40 adapted to inject or extract, individually or in combination, solid, liquid, or gaseous soil treatment compounds, at a selected temperature, into, or from, the soil remediation chambers 20, 400.

For example, the soil treatment delivery system 40 shown in FIG. 3B includes a vapor, liquid and solid emission recovery system 310 for recovering vapor emissions produced in the soil remediation chambers 20. Soil treatment delivery systems and emission recovery systems are described in greater detail in U.S. Pat. No. 5,631,160 and U.S. application Ser. No. 08/693,629, filed on Aug. 8, 1996, now U.S. Pat. No. 5,830,752, invented and owned by the present inventor and are incorporated herein by reference.

In FIG. 3B the emission recovery system 310 can recover emissions such as, but not limited to, vapor, liquid and solid produced or remediated in the soil remediation chambers 20. The emission recovery system 310 includes, but is not limited to, a thermal oxidation system or an activated carbon system. For example, thermal oxidation systems such as flameless oxidizers for VOC and HAP control are made by Thermatrix Inc. can be incorporated directly into a remediation chamber 20 or added at any point along or between a remediation chamber 20.

In one aspect of the present invention the emission recovery system 310 has a hydraulic power source 210 which includes a combustion engine, a hydraulic pump driven by the engine and a hydraulic reservoir for storing and supplying hydraulic fluid to the hydraulic pump. It is understood that the power source need not be hydraulic and can be provided by a power source that is external to the multi-section soil remediation device 10.

The power source 210 may further include ancillary hydraulically powered appliances and related attachments including, but not limited to: fluid pumps, air blowers, fluid storage containers, and air treatment canisters 220. The power source further includes a hydraulic distribution system which directs the hydraulic power to the ancillary appliances of the power unit and to the auxiliary equipment associated with the vehicle. The distribution system may be separate from or incorporated with the hydraulic pump. The power source 210 may further include a control console (not shown) and related circuitry adapted for mounting on a vehicle in proximity to its operator. The control console is used to control and operate the ancillary appliances of the power source 210 and the auxiliary equipment associated with a vehicle 200.

Figure 4:
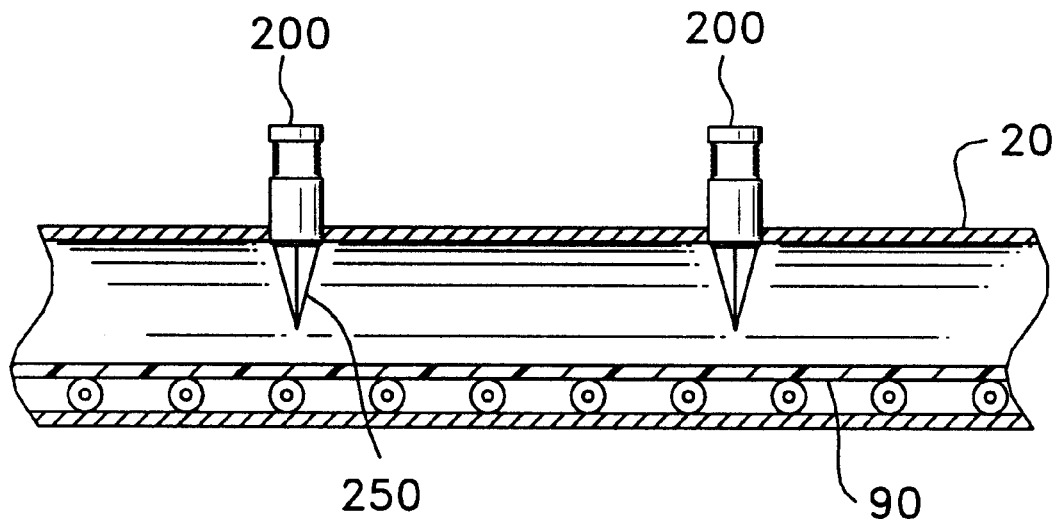
FIG. 4 is an illustration of a portion of the multi-section soil remediation device as contemplated by the present invention having a magnetohydrodynmic plasma apparatus for soil remediation.

In another aspect of the present invention as shown in FIG. 4, a portion of the multi-section soil remediation device 10 as contemplated by the present invention has a magnetohydrodynmic plasma apparatus 200 for soil remediation. The magnetohydrodynmic plasma apparatus 200 has a probe 250 that allows plasma energy to contact and treat the soil on a conveyer 90 within the soil remediation chambers 20. It is contemplated that plasma devices such as Arc Plasma Systems and Induction Coupled Plasma (ICP) technology would be used by the present invention. An example of one such ICP system is described in Plasma Technology, Inc., *Induction Coupled Plasma (ICP) in Comparison with ARC Plasma Systems An Introduction,* and is incorporated herein by reference.

It is also contemplated that soil remediation can be accomplished by other processes such as biodegradation, hot air injection, and/or the use of phosphate or carbonate sources. For example, degradation of coal tar and its constituents can be accomplished by white rot fungi or by phanerochaete chrysosporium as described in U.S. Pat. Nos. 5,597,730 and 5,459,065, respectively and are incorporated herein by reference. Hot air injection can be accomplished by utilizing the exhaust heat that is generated by engines on-board or in proximity to the invention. In another example, remediation of soils or slurries containing heavy metals such as arsenic, cadmium, chromium, copper, lead, or zinc can be accomplished by applying phosphate, carbonate or sulfate sources as described for example in U.S. Pat. Nos. 5,202,033 , 5,037,479 and 4,889,640 and are incorporated herein by reference.

Figure 5:
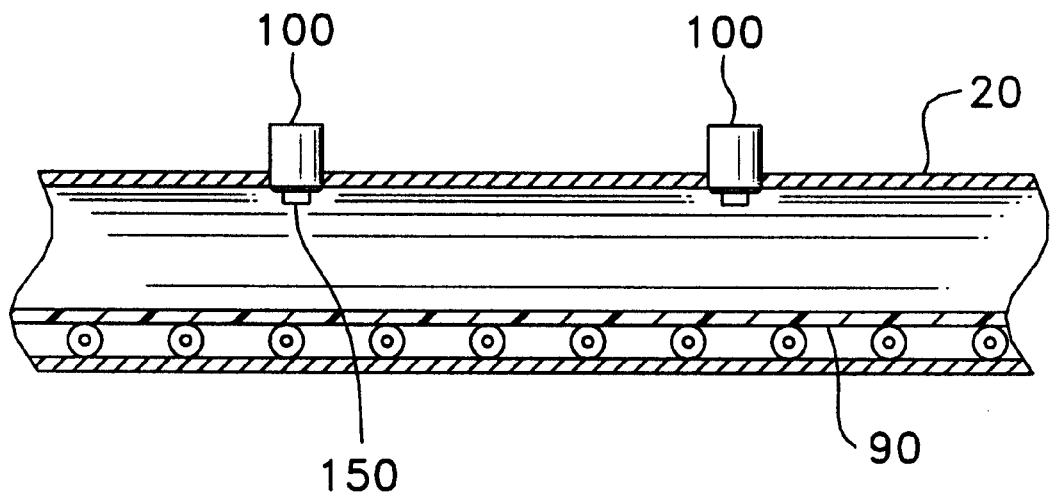
FIG. 5 is an illustration of a portion of the multi-section soil remediation device as contemplated by the present invention having a laser apparatus for soil remediation.

In yet another aspect of the present invention as shown in FIG. 5, a portion of the multi-section soil remediation device 10 as contemplated by the present invention has a laser apparatus 100 for soil remediation. The laser apparatus 100 has an aperture 150 that allows laser energy to contact and treat the soil in the conveyer 90 with in the soil remediation chambers 20. It is contemplated that laser devices such as, but not limited to, a LUMONICS Corporation MW3000 focus head would be used by the present invention.

Multiple laser apparatus 100 and magnetohydrodynmic plasma apparatus 200 can be mounted to the soil remediation chambers 20. These apparatus can be positioned to provide 360° area coverage of laser or plasma energy on the soil as it is conveyed through the soil remediation chambers 20. The laser apparatus 100 and magnetohydrodynmic plasma apparatus 200 can be mounted on one or all of the soil remediation chambers 20 as needed to ensure complete treatment of the soil.

Power for the laser apparatus 100 and magnetohydrodynmic plasma apparatus 200 can be supplied by the power source 210 as shown in FIG. 3A. It is recognized that laser and plasma treatment can induce extremely high temperatures within the soil remediation chambers 20. Heat sensors and air emission monitoring equipment can employed to maintain environmental compliance and the interior components of the soil remediation chambers 20 can be made of suitable heat resistant materials to ensure proper operation of the equipment.

In yet another aspect of the present invention (not shown), at least one soil remediation chambers 20 is a membrane treatment system such as, but not limited to, a Kenterprise Research, Inc. MLM-20 oil separator as described by James Keane, *Membrane-Like-Material A New Approach for Oily Water Treatment* Spills Control Management 1996 and incorporated herein by reference.

In yet another aspect of the present invention (not shown), at least one soil remediation chambers 20 is an oxygen treatment system such as, but not limited to, a PermeOx® Solid Peroxygen system made by FMC Corporation as described in *Permex® Solid Peroxygen Can Enhance Conventional Bioremediation Methods,* FMC Corporation 1994 and incorporated herein by reference.

In yet another aspect of the present invention (not shown), at least one soil remediation chamber 20 is equipped with an ultraviolet light source for treatment of contaminates susceptible to ultraviolet light.

In yet another aspect of the present invention (not shown), the track vehicle 200 is equipped with a Ground Penetrating Radar System (GPR) for locating underground utility installations, geologic formations, and debris. In addition, the track vehicle can have magnetic material removal devices, screening, shredding and crashing devices for additional treatment of the soil within the soil remediation chambers 20.

In yet another aspect of the present invention, the present invention 10 including the track vehicle 200 and can be manually operated on-board, remotely operated or configured to automatically operate according to pre-selected parameters stored in an on-board computerized control system.

Figure 6:
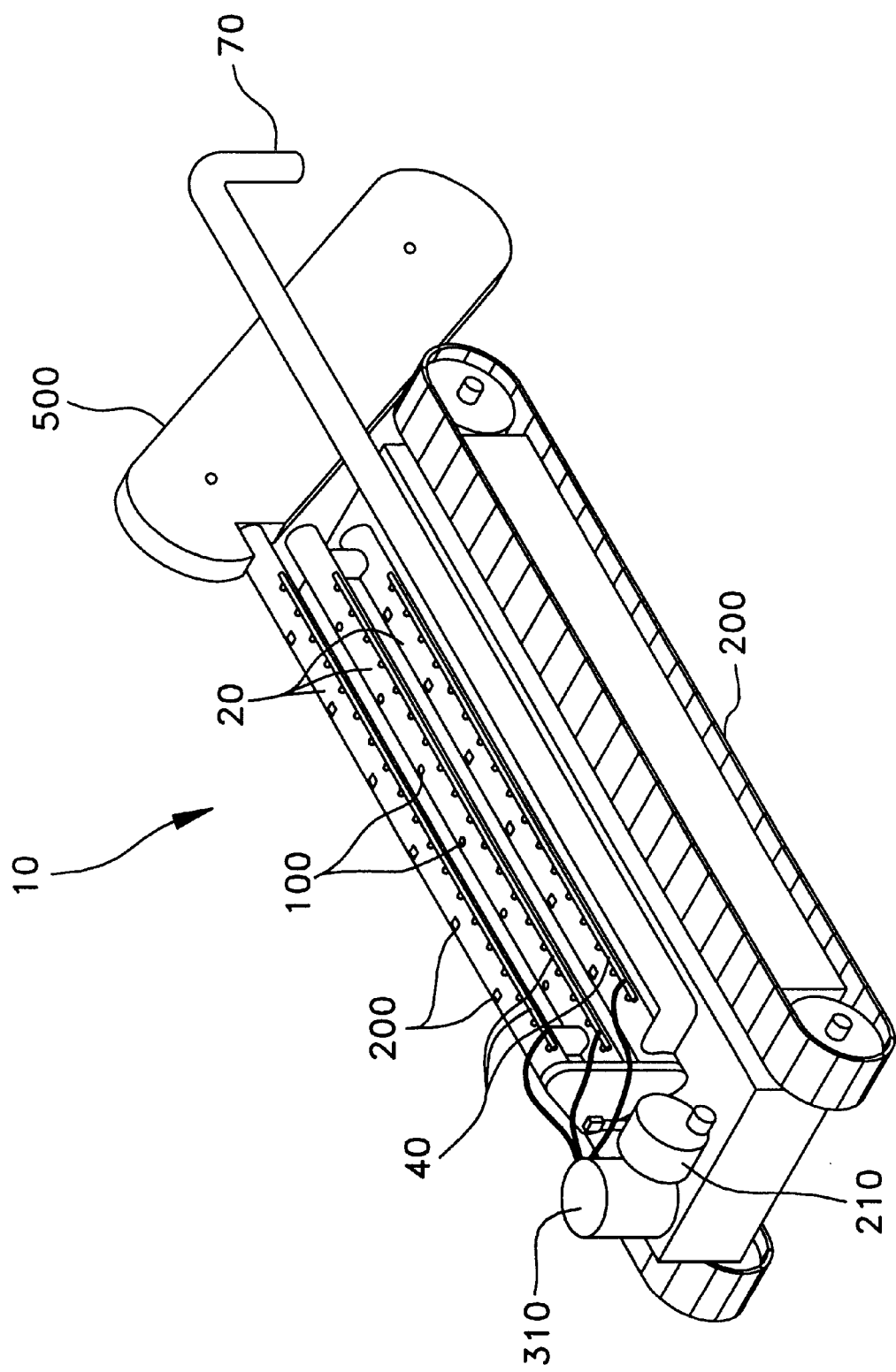
FIG. 6 is an illustration of a multi-section soil remediation device as contemplated by the present invention having an alternate arrangement of elements and shown attached to a vehicle.

In another aspect of the present invention as shown in FIG. 6, the multi-section soil remediation device 10 can be attached to an in-situ trenching tool 500 as described in U.S. Pat. No. 5,631,160. FIG. 6 shows the vehicle 200, power source 210 and emission recovery system 310 for operation in cooperation with the trenching tool 500.

The trenching tool 500 penetrates the ground, churns, comminutes, and macerates the soil in situ with a plurality of chain driven carbide-tipped teeth (not shown). A portion of the soil is feed into a soil remediation chambers 20 where a remediation fluid is discharged into the soil as it is conveyed through the remediation chambers 20. In one aspect of the present invention, a screw type conveyer (as shown in FIG. 1) is used which comminutes the soil allowing it to macerate with the treatment fluids which further enhances the extraction of contaminates.

The contaminates are also removed from the soil remediation chambers 20 by a common or additional soil treatment delivery system 40. It is understood that the remediation fluid may include, and is not limited to, decontamination solids, fluids or heated gases such as air as described in greater detail in U.S. Pat. No. 5,631,160.

As shown in FIG. 6, a remediation fluid injection apparatus 40 is mounted to the remediation chambers 20 to inject a remediation fluid and extract contaminants from a portion of the soil provided by the trenching tool 500. The injection apparatus 40 includes a plurality of injectors positioned along the length of the remediation chambers 20. The injectors are supplied with remediation fluid by the emission recovery system 310. This in-situ soil remediation treatment apparatus and procedure is further explained in related U.S. Pat. No. 5,631,160.

It will be appreciated that the present invention provides a highly flexible, highly adaptable soil remediation system which enables rapid and adaptable treatment of contaminated materials. In addition, the invention's multi-section construction greatly reduces complexity and cost of the equipment while providing greater efficiency and productivity. These and other advantages of the present invention will be apparent to those skilled in the art from the foregoing specification.

The present invention may be embodied in other specific forms without departing from the spirit or essential attributes thereof and, accordingly, reference should be made to the appended claims, rather than to the foregoing specification, as indicating the scope of the invention.

What is claimed is:

1. A soil remediation device for remediating contaminated soil, said remediation device comprising:
    at least two soil remediation chambers each having an inlet, an outlet, and a soil conveyor therein to conveying soil from the chamber inlet to its outlet, said soil remediation chamber being arranged such that the outlet of at least one remediation chamber feeds soil into the inlet of at least one other remediation chamber,
    a soil treatment delivery system connected to and in communication with at least one of said soil remediation chamber for delivering soil treatment to soil conveyed in said soil remediation chamber, and
    wherein at least one soil remediation chamber has a laser apparatus to soil remediation.

2. The soil remediation device according to claim 1, wherein at least two soil remediation chambers are connected together, said soil remediation chambers are cylindrical tubes, and said conveyor is a screw conveyor operative within said cylindrical tubes for moving said soil received and discharged by said cylinder.

3. The soil remediation device according to claim 2, wherein said soil remediation chambers are further arranged in a vertical plane and attached to a track vehicle such that said screw conveyors are powered by said track vehicle.

4. The soil remediation device according to claim 2, wherein said soil remediation chambers are further arranged in a horizontal plane and attached to a track vehicle such that said screw conveyors are powered by said track vehicle.

5. The soil remediation device according to claim 1, wherein said soil treatment delivery system is adapted to inject or extract, individually or in combination solid, liquid, or gaseous soil treatment compounds, at a selected temperature, into, or from, said soil remediation chambers.

6. The soil remediation device according to claim 1, wherein said soil treatment delivery system includes a vapor emission recovery system for recovering vapor emissions produced in said soil remediation chambers.

7. The soil remediation device according to claim 1, wherein said soil treatment delivery system includes a liquid emission recovery system for recovering liquid emissions produced in said soil remediation chambers.

8. The soil remediation device according to claim 1, wherein said soil treatment delivery system includes a solid emission recovery system for recovering solid emissions produced in said soil remediation chambers.

9. The soil remediation device according to claim 1, wherein said soil remediation chambers are further arranged in a vertical plane.

10. The soil remediation device according to claim 1, wherein said soil remediation chambers are further arranged in a horizontal plane.

11. A soil remediation device for remediating contaminated soil, said remediation device comprising:
   a plurality of soil remediation chambers each comprising a cylindrical tube, each tube having an inlet, an outlet, and a screw conveyor therein for conveying soil from the inlet to the outlet, said soil remediation chambers being arranged such that the outlet of at least one remediation chamber feeds soil into the inlet of at least one other remediation chamber, and at least one outlet of said soil remediation chambers discharging soil to the ground,
   a soil treatment delivery system connected to and in communication with said soil remediation chambers for delivering soil treatment to soil conveyed in said soil remediation chambers,
   a vehicle supporting said plurality of soil remediation chambers and said soil treatment delivery system, said vehicle having a trenching tool for removing contaminated soil from the ground, and feeding said contaminated soil into the inlet of at least one soil remediation chamber, and
   wherein at least one soil remediation chamber has a laser apparatus for soil remediation.

12. The soil remediation device according to claim 11, wherein said soil remediation chambers are further arranged in a vertical plane and attached to said vehicle such that said screw conveyors are powered by said vehicle.

13. The soil remediation device according to claim 11, wherein said soil remediation chambers are further arranged in a horizontal plane and attached to said vehicle such that said screw conveyors are powered by said vehicle.

14. The soil remediation device according to claim 11, wherein said soil treatment delivery system is adapted to inject or extract, individually or in combination, solid, liquid, or gaseous soil treatment compounds, at a selected temperature, into, or from, said soil remediation chambers.

15. The soil remediation device according to claim 11, wherein said soil treatment delivery system includes a vapor emission recovery system for recovering vapor emissions produced in said soil remediation chambers.

16. The soil remediation device according to claim 11, wherein said soil treatment delivery system includes a liquid emission recovery system for recovering liquid emissions produced in said soil remediation chambers.

17. The soil remediation device according to claim 11, wherein said soil treatment delivery system includes a solid emission recovery system for recovering solid emissions produced in said soil remediation chambers.

18. The soil remediation device according to claim 11, wherein said soil remediation chambers are further arranged in a vertical plane.

19. The soil remediation device according to claim 11, wherein said soil remediation chambers are further arranged in a horizontal plane.

20. The soil remediation device according to claim 11, wherein at least one soil remediation chamber is a oxygen treatment system.

21. A soil remediation device for remediating contaminated soil, said remediation device comprising:
   at least two soil remediation chambers each having an inlet, an outlet, and a soil conveyor therein for conveying soil from the chamber inlet to its outlet, said soil remediation chamber being arranged such that the outlet of at least one remediation chamber feeds soil into the inlet of at least one other remediation chamber,
   a soil treatment delivery system connected to and in communication with at least one of said soil remediation chamber for delivering soil treatment to soil conveyed in said soil remediation chamber, and
   wherein at least one soil remediation chamber has a magnetohydrodynmic plasma apparatus for soil remediation.

22. The soil remediation device according to claim 21, wherein at least two soil remediation chambers are connected together, said soil remediation chambers are cylindrical tubes, and said conveyor is a screw conveyor operative within said cylindrical tubes for moving said soil received and discharged by said cylinder.

23. The soil remediation device according to claim 22, wherein said soil remediation chambers are further arranged in a vertical plane and attached to a track vehicle such that said screw conveyors are powered by said track vehicle.

24. The soil remediation device according to claim 22, wherein said soil remediation chambers are further arranged in a horizontal plane and attached to a track vehicle such that said screw conveyors are powered by said track vehicle.

25. The soil remediation device according to claim 21, wherein said soil treatment delivery system is adapted to inject or extract, individually or in combination, solid, liquid, or gaseous soil treatment compounds, at a selected temperature, into, or from, said soil remediation chambers.

26. The soil remediation device according to claim 21, wherein said soil treatment delivery system includes a vapor emission recovery system for recovering vapor emissions produced in said soil remediation chambers.

27. The soil remediation device according to claim 21, wherein said soil treatment delivery system includes a liquid emission recovery system for recovering liquid emissions produced in said soil remediation chambers.

28. The soil remediation device according to claim 21, wherein said soil treatment delivery system includes a solid emission recovery system for recovering solid emissions produced in said soil remediation chambers.

29. The soil remediation device according to claim 21, wherein said soil remediation chambers are further arranged in a vertical plane.

30. The soil remediation device according to claim 21, wherein said soil remediation chambers are further arranged in a horizontal plane.

31. A soil remediation device for remediating contaminated soil, said remediation device comprising:
   a plurality of soil remediation chambers each comprising a cylindrical tube, each tube having an inlet, an outlet, and a screw conveyor therein for conveying soil from the inlet to the outlet, said soil remediation chambers being arranged such that the outlet of at least one remediation chamber feeds soil into the inlet of at least one other remediation chamber, and at least one outlet of said soil remediation chambers discharging soil to the ground,
   a soil treatment delivery system connected to and in communication with said soil remediation chambers for delivering soil treatment to soil conveyed in said soil remediation chambers,
   a vehicle supporting said plurality of soil remediation chambers and said soil treatment delivery system, said vehicle having a trenching tool for removing contaminated soil from the ground, and feeding said contaminated soil into the inlet of at least one soil remediation chamber, and
   wherein at least one soil remediation chamber has a magnetohydrodynmic plasma apparatus for soil remediation.

32. The soil remediation device according to claim 31, wherein said soil remediation chambers are further arranged in a vertical plane and attached to said vehicle such that said screw conveyors are powered by said vehicle.

33. The soil remediation device according to claim 31, wherein said soil remediation chambers are further arranged in a horizontal plane and attached to said vehicle such that said screw conveyors are powered by said vehicle.

34. The soil remediation device according to claim 31, wherein said soil treatment delivery system is adapted to inject or extract, individually or in combination, solid, liquid, or gaseous soil treatment compounds, at a selected temperature, into, or from, said soil remediation chambers.

35. The soil remediation device according to claim 31, wherein said soil treatment delivery system includes a vapor emission recovery system for recovering vapor emissions produced in said soil remediation chambers.

36. The soil remediation device according to claim 31, wherein said soil treatment delivery system includes a liquid emission recovery system for recovering liquid emissions produced in said soil remediation chambers.

37. The soil remediation device according to claim 31, wherein said soil treatment delivery system includes a solid emission recovery system for recovering solid emissions produced in said soil remediation chambers.

38. The soil remediation device according to claim 31, wherein said soil remediation chambers are further arranged in a vertical plane.

39. The soil remediation device according to claim 31, wherein said soil remediation chambers are further arranged in a horizontal plane.

40. The soil remediation device according to claim 31, wherein at least one soil remediation chamber is a oxygen treatment system.

41. A soil remediation device for remediating contaminated soil, said remediation device comprising:
   a plurality of soil remediation chambers each comprising a cylindrical tube, each tube having an inlet, an outlet, and a screw conveyor therein for conveying soil from the inlet to the outlet, said soil remediation chambers being arranged such that the outlet of at least one remediation chamber feeds soil into the inlet of at least one other remediation chamber, and at least one outlet of said soil remediation chambers discharging soil to the ground,
   a soil treatment delivery system connected to and in communication with said soil remediation chambers for delivering soil treatment to soil conveyed in said soil remediation chambers,
   a vehicle supporting said plurality of soil remediation chambers and said soil treatment delivery system, said vehicle having a trenching tool for removing contaminated soil from the ground, and feeding said contaminated soil into the inlet of at least one soil remediation chamber, and
   wherein at least one soil remediation chamber has a membrane treatment system for soil remediation.

42. The soil remediation device according to claim 41, wherein said soil remediation chambers are further arranged in a vertical plane and attached to said vehicle such that said screw conveyors are powered by said vehicle.

43. The soil remediation device according to claim 41, wherein said soil remediation chambers are further arranged in a horizontal plane and attached to said vehicle such that said screw conveyors arc powered by said vehicle.

44. The soil remediation device according to claim 41, wherein said soil treatment delivery system is adapted to inject or extract, individually or in combination, solid, liquid, or gaseous soil treatment compounds, at a selected temperature, into, or from, said soil remediation chambers.

45. The soil remediation device according to claim 41, wherein said soil treatment delivery system includes a vapor emission recovery system for recovering vapor emissions produced in said soil remediation chambers.

46. The soil remediation device according to claim 41, wherein said soil treatment delivery system includes a liquid emission recovery system for recovering liquid emissions produced in said soil remediation chambers.

47. The soil remediation device according to claim 41, wherein said soil treatment delivery system includes a solid emission recovery system for recovering solid emissions produced in said soil remediation chambers.

48. The soil remediation device according to claim 41, wherein said soil remediation chambers are further arranged in a vertical plane.

49. The soil remediation device according to claim 41, wherein said soil remediation chambers are further arranged in a horizontal plane.

50. The soil remediation device according to claim 41, wherein said soil remediation chamber is a oxygen treatment system.

* * * * *